No. 689,801. Patented Dec. 24, 1901.
J. D. HAWES.
THRESHING AND SEPARATING APPLIANCE.
(Application filed Jan. 25, 1901.)
(No Model.) 2 Sheets—Sheet 1.
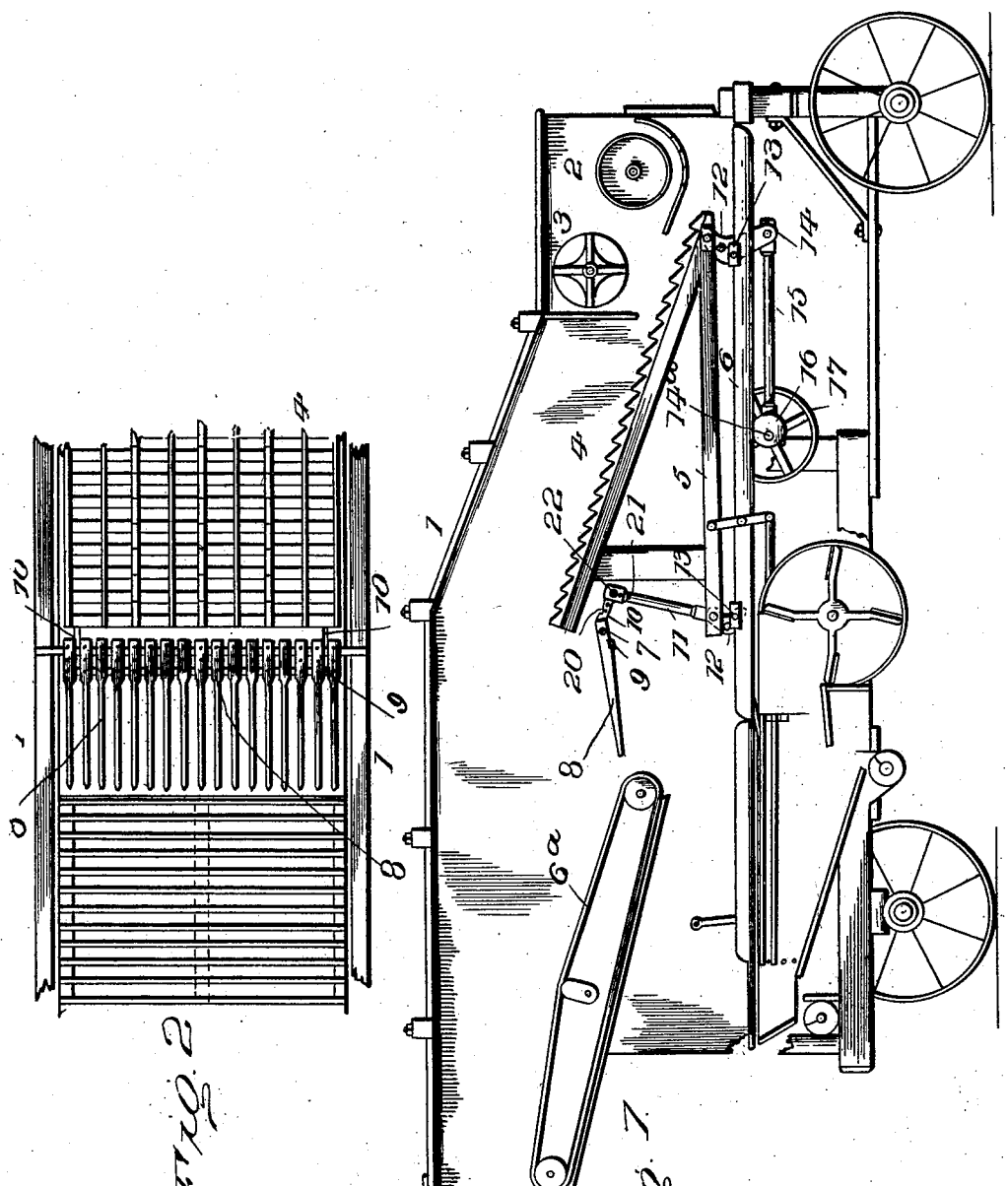
Inventor
Joel D. Hawes.
Witnesses
Walter A. Williams.
Wm. J. Jacob.
By Jno. Smirie
Attorney

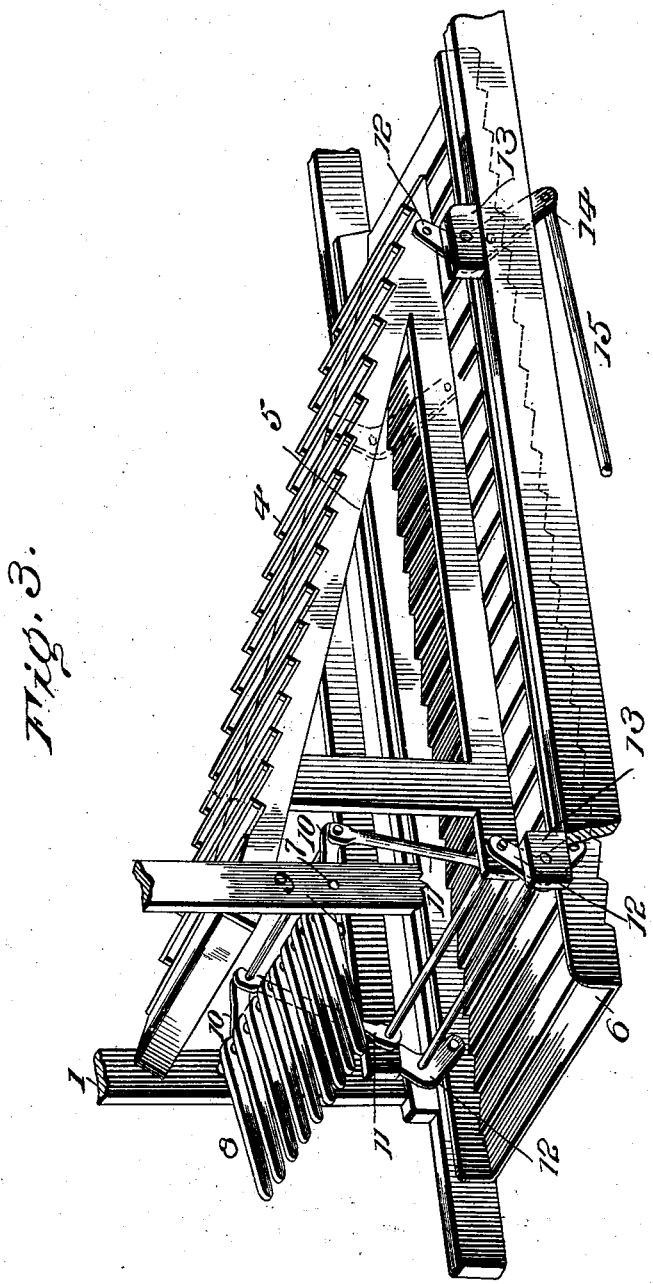

UNITED STATES PATENT OFFICE.

JOEL D. HAWES, OF DECORAH, IOWA.

THRESHING AND SEPARATING APPLIANCE.

SPECIFICATION forming part of Letters Patent No. 689,801, dated December 24, 1901.

Application filed January 25, 1901. Serial No. 44,754. (No model.)

*To all whom it may concern:*

Be it known that I, JOEL D. HAWES, a citizen of the United States, residing at Decorah, in the county of Winneshiek and State of Iowa, have invented new and useful Improvements in Threshing and Separating Appliances, of which the following is a specification.

This invention relates to improvements in grain separators and threshers, and more especially to the means employed for spreading and threshing the grain as it passes from the straw-shaker to the rattle-rake or tailer.

The object of the invention is to connect the straw-separating fingers between the rattle-rakes and the straw-shaker in such manner as to impart an oscillating motion to said fingers to more thoroughly spread and shake the grain and straw.

Many other objects and advantages will be hereinafter referred to and be particularly pointed out in the claims.

In the drawings forming a part of this specification, Figure 1 is a vertical section of a portion of a threshing-machine, showing the application of my improvements. Fig. 2 is a detail plan view of the straw-separating means. Fig. 3 is a perspective view of the improvement stripped of the frame of the thresher.

The same numerals refer to like parts in all the figures.

1 represents the frame of a thresher, 2 the threshing-cylinder, 3 the beater, 4 the slats of the straw-shaker 5, 6 the grain-pan, and 6$^a$ the rattle-rake, all of which are of ordinary construction, and further detail description thereof is not deemed necessary.

A shaft 7 is suitably mounted in the thresher-frame 1 at a point approximately under and in the rear of the upper end of the straw-shaker. This shaft 7 carries a platform for the grain and, as shown, preferably comprises a number of straw-separating fingers 8, the ends projecting toward the front roller of the rattle-rake or tailer, a bar 9 connecting the fingers to rigidly hold them together. Near the ends of the shaft 7 are forwardly-extending arms 10, which are connected to the straw-shaker by links 11 in such manner that the horizontal reciprocating movement of said shaker imparts an oscillating movement to the fingers. The straw-shaker 5 is mounted on levers 12, pivotally supported in bearings 13, secured to the frame 1, the front lever 12 being extended, as at 14, to which is connected a pitman 15, the latter connected to an eccentric or crank 16, mounted on a shaft 14$^a$, the latter having a band-wheel 17 on one end.

The parts being thus constructed, the operation is substantially as follows: Grain in the straw is fed to the thresher in the usual manner and eventually reaches the upper rear end of the straw-shaker, from whence it is delivered to the straw-separating fingers and subjected to a thorough shaking and spreading. As a rule after the grain passes from the straw-shaker its treatment, in so far as the separating of the grain is concerned, is finished, and unless great care is taken the grain still clinging to the straw is practically lost; but by connecting a vertically-oscillating separator to the horizontally-reciprocating straw-shaker by links a quick and long throw or tumbling action is given the grain and straw. This rapid and long throw of the straw positively threshes and separates any clinging grain and renders a great saving in the net outcome.

It will be noted that the fingers are mounted on the shaft 7 near the ends, this being for the purpose of imparting a long throw to the rear ends of said fingers and insuring a sudden drop of the same, adding considerable to the separating and threshing action. To regulate the throw of the fingers, the arms 10 have a series of openings 20, likewise the links are provided with openings 21, the connecting-pin 22 passing through the selected openings when the throw of the fingers has been determined.

My invention is extremely simple in construction, durable in character, and of such nature as to be thoroughly understood by those skilled in the art to which it appertains.

Having thus described my invention, what I claim is—

1. In an apparatus of the class described, the combination with a vibratable straw-shaker and grain-pan, means for horizontally vibrating said shaker and grain-pan in opposite directions, a tailer, a series of fingers between said straw-shaker and the tailer, oscillating means separate from the straw-shaker and grain-pan on which the fingers are mounted, links connecting the fingers and the straw-shaker, said links being connected to the ends of said fingers in advance of the means on which the fingers are mounted, whereby the horizontal movement of the vibratable straw-shaker and grain-pan vertically oscillates the fingers, substantially as and for the purpose described.

2. In an apparatus of the class described, the combination with a vibratable straw-shaker and grain-pan, means for horizontally vibrating said shaker and grain-pan in opposite directions, a tailer, fingers between said slatted shaker and the tailer, an oscillating rock-shaft independent of the slatted shaker on which said fingers are mounted, an arm or arms connected to and extending beyond said rock-shaft and in a direction opposite to said fingers, and links pivotally secured at one end to said arms and at their opposite ends to the lower end of the slatted straw-shaker, substantially as and for the purpose described.

3. In an apparatus of the class described, the combination with a movable slatted straw-shaker and grain-pan, means for horizontally vibrating said slatted straw-shaker and grain-pan in opposite directions, a tailer, fingers between said slatted straw-shaker and grain-pan and the tailer, a rock-shaft independent of the slatted shaker on which said fingers are mounted, arms projecting from said rock-shaft in a direction opposite the fingers, and means connecting said arms and the lower end of the slatted straw-pan, whereby the horizontal movement of the grain-pan oppositely reciprocates the slatted shaker and imparts a vertical oscillating movement to the fingers, substantially as described.

4. In an apparatus of the class described, the combination with a straw-pan, means for reciprocating said pan, a reciprocating slatted straw-shaker, bearings, levers connecting the grain-pan and slatted straw-shaker, said levers being pivoted to the bearings intermediate the connections to the grain-pan and slatted straw-shaker, a tailer, a series of fingers mounted to rock vertically between the slatted straw-shaker and tailer, links connecting the fingers and the straw-shaker, whereby a horizontal reciprocating movement of the grain-pan oppositely reciprocates the slatted straw-shaker and imparts simultaneously therewith through the medium of the links, a vertical oscillating movement to the fingers, substantially as described.

5. In an apparatus of the class described, the combination with a slatted straw-shaker, a longitudinally-reciprocating grain-pan between the shaker, stationary bearings, rocking levers mounted in said stationary bearings and connected above and below their pivots with the slatted straw-shaker and the grain-pan respectively, a rock-shaft mounted in stationary bearings below the discharge end of the shaker, fingers mounted on and projecting rearwardly from said rock-shaft, arms rigid with the rock-shaft and projecting forwardly under the straw-shaker, pitmen connecting said arms with the upper pivots of the rear rocking levers, and a pitman or pitmen connected to the front rocking levers, whereby simultaneous back-and-forth reciprocation will be given to the shaker and grain-pan, and vertical oscillation to the fingers, substantially as and for the purpose described.

In testimony whereof I have hereunto set my hand in the presence of two subscribing witnesses.

JOEL D. HAWES.

Witnesses:
GEO. W. ADAMS,
C. F. STILES.